May 26, 1936.   W. HARPER, JR   2,041,709
COMBUSTION ENGINE
Filed Dec. 8, 1932   5 Sheets-Sheet 5

INVENTOR
WILLIAM HARPER, JR.
BY
ATTORNEY

Patented May 26, 1936

2,041,709

UNITED STATES PATENT OFFICE 2,041,709

COMBUSTION ENGINE

William Harper, Jr., Port Washington, N. Y., assignor to H. B. Motor Corporation, a corporation of New York Application December 8, 1932, Serial No. 646,839

84 Claims. (Cl. 123—73)

This invention relates to combustion engines and has particular reference to method and means for supercharging an engine to increase the volumetric efficiency, together with various improvements in structural combinations for practicably carrying the invention into effect, and has further reference to method and means for preventing loss of charge in an engine having inlet and exhaust ports open at the same time.

According to this invention the charge to be compressed in a combustion space, whether carbureted mixture or air into which the liquid fuel will be injected after compression in the combustion space, is supplied to the combustion space under superatmospheric pressure, to thereby increase the volumetric efficiency and hence the power output of an engine having a given displacement. While it is known that supercharging a combustion space under positive or superatmospheric pressure will increase the volumetric efficiency, the common means heretofore provided of external blowers or pumps is unsatisfactory, besides increasing the overall weight of the engine and, moreover, such external blowers or pumps consume power and thereby reduce the overall efficiency of the engine. It is an object of this invention to provide supercharging means operated by high pressure exhaust in such a way as not to contaminate the fresh charge with burned exhaust gas. The invention further contemplates means whereby the exhaust gas is scavenged out of the supply system after it has performed its function of building up the supply pressure at the time of charging into the combustion space. The combustion space shown herein is in the form of a conventional two-cycle cylinder with inlet and exhaust ports controlled by a movable explosion driven member such as a piston, but in its broad aspect the invention is not confined to such conventional types as the engine shown.

In carrying out the invention I provide a charging reservoir in which fluid, either air or carbureted mixture, is maintained under pressure, which is herein specifically shown as by crank case compression effected by the piston. To build up such reservoir pressure so as to accomplish superatmospheric pressure charging of the combustion space within the limited time permitted in modern high duty engines, part of the explosion pressure when at or about its maximum is discharged against a column of charging fluid for the next working stroke so as to build up the reservoir pressure and discharge it into the combustion space as soon as the inlet thereto is opened. In the form shown, this inlet is opened by continued inward travel of the piston, but of course may be opened and controlled by known types of cam actuated inlet valves in the conventional manner. The preliminary charging exhaust is connected with the fluid pressure reservoir in any desired manner, and as herein specifically shown, is connected thereto by an escapement port in the cylinder which is uncovered by the piston in advance of the piston uncovering the main exhaust, which latter in a conventional two-cycle engine occurs somewhat before the end of the inward piston stroke.

The invention, either in conjunction with supercharging or independently thereof, prevents loss of charge in an engine having inlet and exhaust ports open at the same time. This is accomplished by charging the combustion space and then injecting gas into the combustion space adjacent the exhaust port and against the charge before closing the exhaust port, whereby the injected gas passes out through the exhaust port and bucks the fresh charge away from said port. In the form shown, the injected gas is high pressure exhaust gas which is trapped from a preceding explosion and is injected back into the combustion space. The explosion driven member or piston head is shaped to direct this returned gas out through the exhaust port before said port is closed during the compression stroke.

The invention also provides various other improvements and combinations including a compact convoluted supercharging chamber which greatly increases the volume and compression of the charge as well as the supercharging efficiency; the connection of a plurality of supercharging chambers to separated compression chamber of a multicylinder engine; an improved blower and means in combination with a blower for rapidly and evenly charging all the compression chambers of a multicylinder engine; a division of exhaust gases in such a way as to enable the engine to be muffled without appreciable loss of power; a timed valve for discharging residual exhaust gas from the supercharging chambers to prevent dilution of the fresh charge; means for controlling the pressure behind the high pressure exhaust gas in supercharging the cylinders; means for cutting the supercharging effect in and out independently or in combination with means for throttling the fuel supply; improved lubricating means; and various details which simplify the construction and increase the operating efficiency of the engine; all of which will be more fully understood in connection with the description of the accompanying drawings, wherein:

Figures 1, 2:
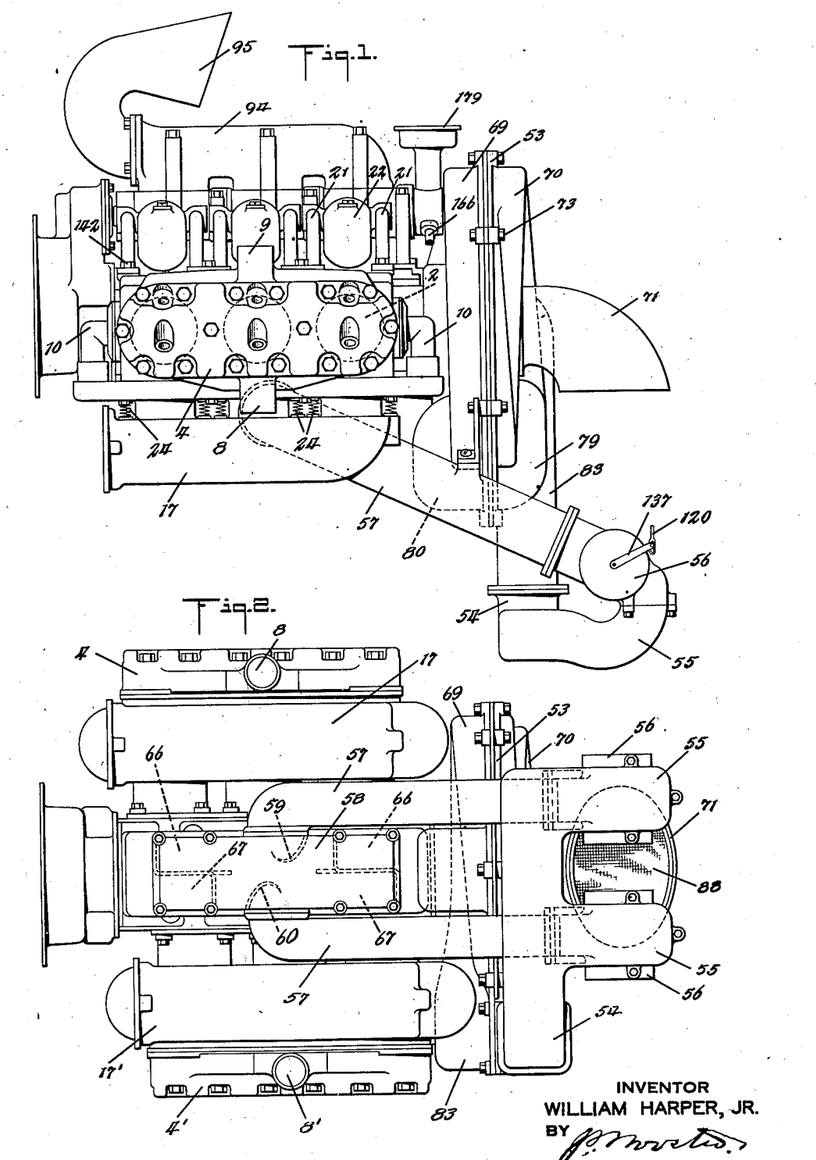
Fig. 1 is a side view showing the arrangement of cylinders, supercharging chambers, exhaust manifolds, blower and fuel supply in an engine embodying the invention.
Fig. 2 is a bottom plan view showing the main exhaust manifolds and the connections from the fuel supply to the inlet manifolds.
Figure 3:
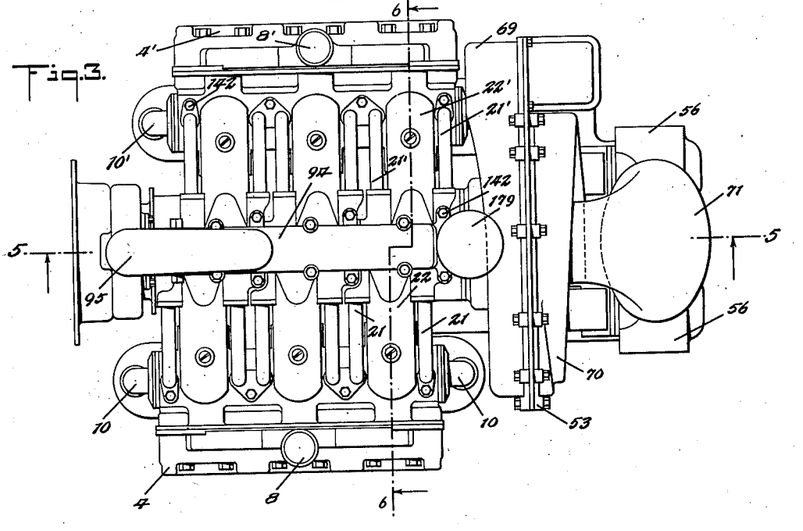
Fig. 3 is a top plan view showing the arrangement of supercharging chambers and associated exhaust manifold.
Figure 6:
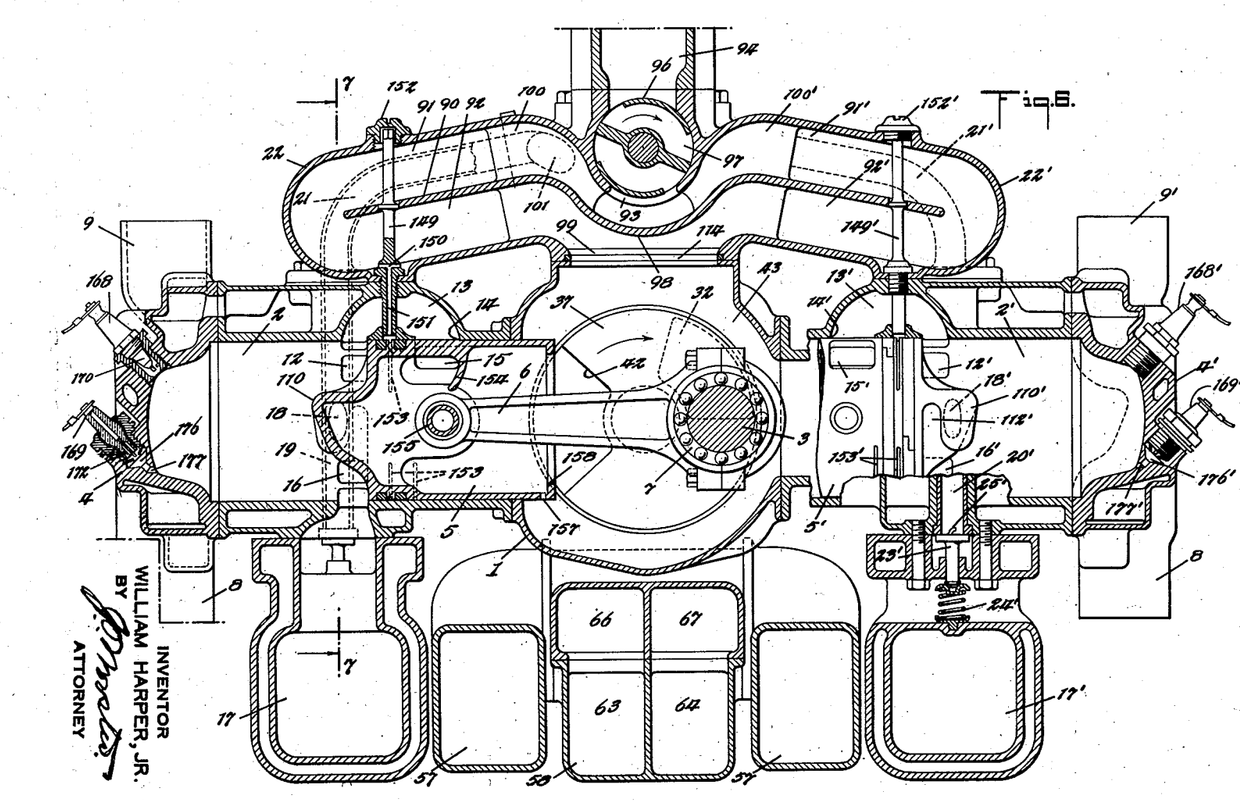
Fig. 6 is a transverse section on line 6—6 of Fig. 3, showing the pistons of opposed cylinders at the end of the inward or working stroke.

The engine shown in the drawings comprises a crank case 1 supporting cylinders 2, 2' arranged on opposite sides of crank shaft 3 and provided with cylinder heads 4, 4'. Hollow reciprocating pistons 5, 5' are connected to crank shaft 3 by connecting links 6, 6' having roller bearing crank pin bushings 7. The engine is suitably water-jacketed and provided with water inlet and outlet ports 8, 8' and 9, 9', respectively, and piping 10, 10' as shown in Figs. 1, 3 and 6.

The engine illustrated has three pairs of opposed cylinders but any other suitable number may be employed. Hence cylinder 2 is typical of any cylinder to the left of the crank case in Fig. 6, while cylinder 2' is typical of the corresponding cylinder to the right of the crank case. Inasmuch as the construction and operation are the same for both these cylinders, most of the description will be confined to cylinder 2 and associated parts to the left of the crank case in Fig. 6, while corresponding parts associated with cylinder 2' will be given similar reference numerals with primes affixed thereto.

Cylinder 2 has a bank of inlet ports 12 adapted to be opened and closed by piston 5. These inlet ports are connected to a by-pass channel 13 the other end of which terminates in ports 14 opening into the lower end of the cylinder. Ports 14 are adapted to register with inlet ports 15 in the piston to transfer the charge (which in this engine is a carbureted mixture) from the crank case to the working cylinder through by-pass 13 and inlet ports 12. The depending baffle carried by the piston, and extending downwardly from ports 15 toward the wrist pin bearing, is for the purpose of forcing the lubricating oil out of the charging mixture and for lubricating the wrist pin bearing as hereinafter described.

Cylinder 2 also has a bank of main exhaust ports 16 on the side opposite inlet ports 12. These exhaust ports communicate with main exhaust manifold 17 and are adapted to be opened and closed by piston 5. Cylinder 2 also has spaced escapement ports 18 which are preferably located opposite each other in the cylinder wall, are of much smaller area than main exhaust ports 16, and are adapted to be opened about the same time as, or slightly ahead of, ports 16.

Figures 7, 8, 9, 10:
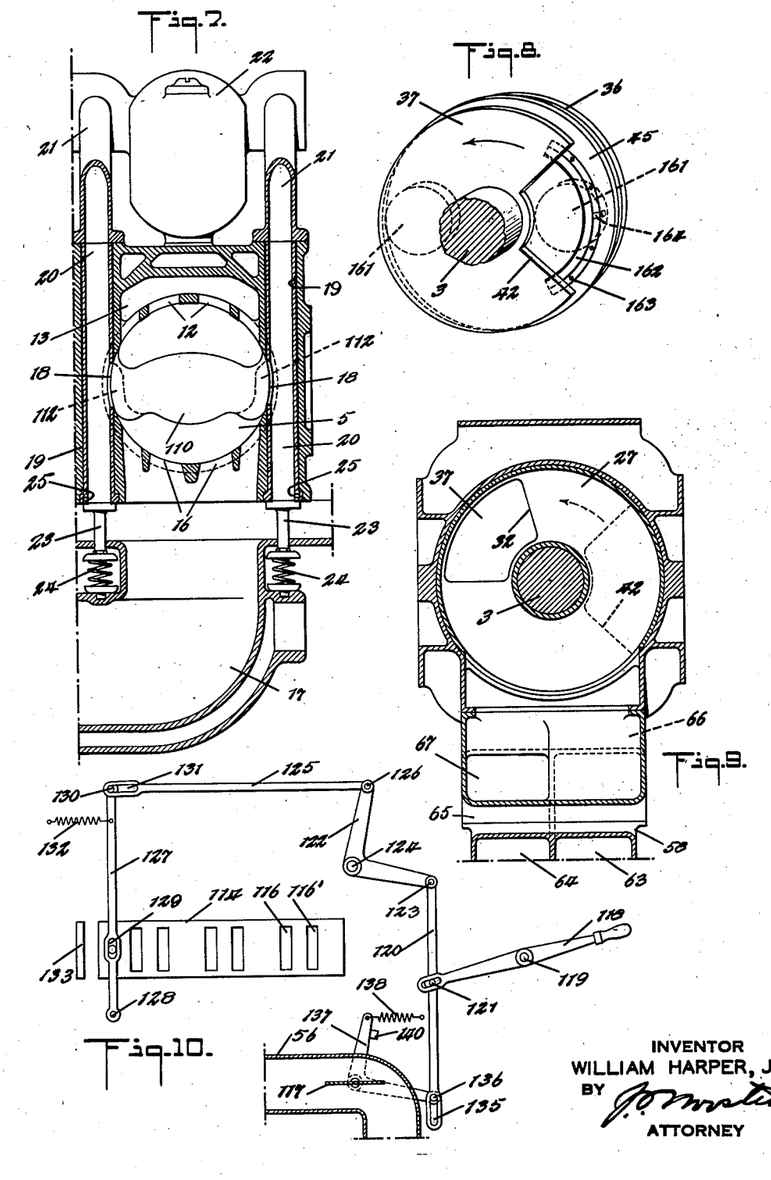
Fig. 7 is a transverse section on line 7—7 of Fig. 6, showing the connections from the escapement ports of one cylinder to the associated supercharging chamber.
Fig. 8 is a fragmentary perspective view of the crank shaft and discs carried thereby.
Fig. 9 is a transverse section through the crank case, taken on line 9—9 of Fig. 5 and showing the ported wall cooperating with the ported disc of Fig. 8.
Fig. 10 is a diagrammatic view of the means for throttling the supercharging chambers and fuel supply.

Escapement ports 18 may be formed by drilling or otherwise forming vertical ducts 19 in the cylinder casting, tangent to cylinder 2 and intersecting same on opposite sides, giving ports 18 an eliptical contour as shown in Figs. 6 and 7. Ducts 19 contain thin tubular metal liners 20 having eliptical holes which register with escapement ports 18. The lower ends of liners 20 fit ducts 19 snugly, frictionally holding the liners in place, while the upper portions adjacent and above ports 18 fit the ducts loosely, permitting the liners to expand under the heat of the exhaust. The liners may be removed for cleaning by inserting a tool through the lower end, gripping the hook 25 formed in the lower end of the liner and then turning the liner and pulling it through the duct. The liners are preferably made of thin heat resisting material such as chromium steel and, as they keep hot enough to burn off carbon, they seldom require cleaning. The upper ends of lined ducts 19 are connected by pipes 21 to one end of supercharging chamber 22 for supercharging cylinder 2 as hereinafter described; while the lower ends of ducts 19 have pressure relief valves 23 provided with springs 24 and adapted to connect the ducts with exhaust manifold 17. Valves 23 act as safety valves and, in the engine illustrated, are preferably set to open at between fifteen and twenty pounds pressure.

Figures 5, 11, 12:
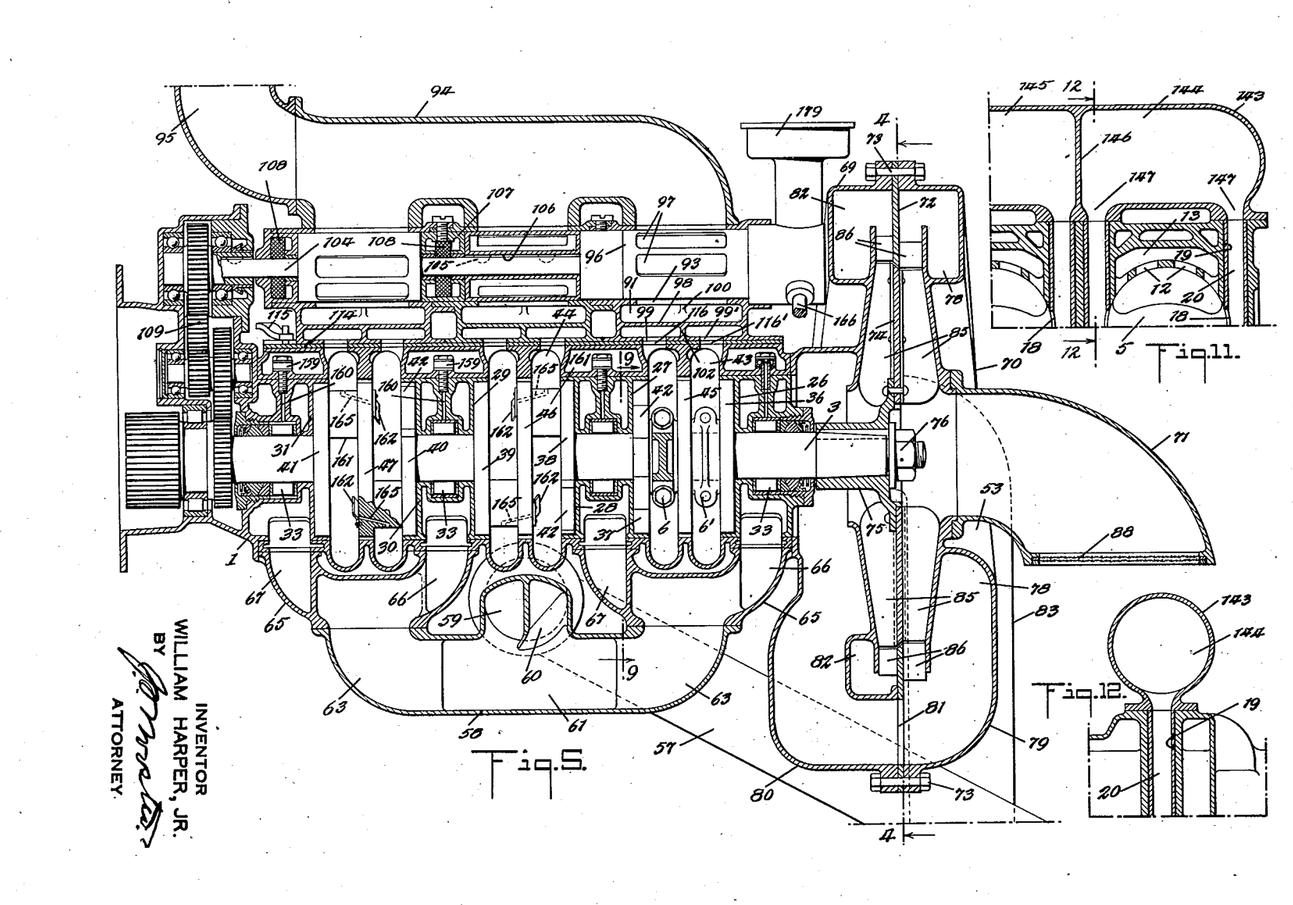
Fig. 5 is a longitudinal section through the crank case and blower, taken on line 5—5 of Fig. 3.
Fig. 11 is a fragmentary sectional view of a chamber for trapping exhaust gas to prevent loss of charge, same being used only when supercharging is not desired.
Fig. 12 is a section taken on line 12—12 of Fig. 11.

Before describing the supercharging I shall describe the construction of the several compression chambers in the crank case and the means for charging said compression chambers. The crank case has interior ported walls 26, 27, 28, 29, 30 and 31 which separate each pair of opposed cylinders from the adjacent pairs of opposed cylinders as shown in Fig. 5. For example, ported walls 26 and 27 are on opposite sides of opposed cylinders 2 and 2', and therefore separate this portion of the crank case from the remaining cylinders; while ported walls 28 and 29 are on opposite sides of the next pair of opposed cylinders, and ported walls 30 and 31 are on opposite sides of the last pair of opposed cylinders to the left of Fig. 5. These walls each have an arcuate port 32 best shown in Figs. 6 and 9.

Crank shaft 3 is mounted in roller bearings 33 and carries ported discs 36, 37, 38, 39, 40 and 41 which are accurately machined to make sealing contact with the respective ported walls 26, 27, etc. These discs each have an arcuate port 42 adapted to cooperate with port 32 in the respective walls 26, 27, etc. Inasmuch as pistons 5 and 5' of opposed cylinders 2 and 2' work in synchronism, port 42 of disc 36 will open port 32 of wall 26 at the same time that port 42 of disc 37 opens port 32 of wall 27. The next pair of opposed pistons also work in synchronism (though out of phase with pistons 5 and 5') and hence ported discs 38 and 39 will open ported walls 28 and 29 at the same time; the same being true of the other ported discs and walls.

The ported walls and discs described above divide the crank case into separate compression chambers for the several pairs of opposed cylinders. That is, ported walls 26 and 27 cooperate with ported discs 36 and 37 to form a compression chamber 43 for cylinders 2 and 2', while ported walls 28 and 29 cooperate with ported discs 38 and 39 to form a separate compression chamber 44 for the adjacent pair of opposed cylinders, and so on, there being three separated compression chambers in the engine illustrated.

In the preferred form of the invention crank shaft 3 also carries non-ported connecting discs 45, 46 and 47 which are arranged centrally in the respective compression chambers though not in sealing contact with the walls thereof. These particular discs may be replaced by ordinary crank arms without changing the operation of the engine but I prefer the discs because they increase the efficiency of the engine by reducing the area of the compression chambers and correspondingly increasing the pressure of the crank case compression by permitting a more rapid and even distribution of the charge to the several compression chambers, by increasing the supercharging efficiency and by supporting crank pin lubricating means as hereinafter described.

The engine has an accelerating blower 53 which delivers air through main 54 and branches 55 to a pair of carburetors 56 as shown in Figs. 1 to 3. The carburetors have outlet pipes 57 connected to opposite sides of an elongated inlet manifold 58. This manifold has curved inlet passages 59 and 60 leading from pipes 57 and opening in opposite directions into the central portion 61; and has divided passages 63 and 64 located at each end and curved upwardly for connection to branch manifolds 65 which may be formed integral with manifold 58 but are illustrated as separate castings. Branch manifolds 65 are exactly alike and are provided with similar oppositely curved passages 66 and 67 which lead upwardly from the respective passages 63 and 64 into the crank case as shown in Figs. 5, 6 and 9.

Since there are two branch manifolds 65, and since each branch manifold has two passages numbered 66 and 67 respectively, a total of four supply passages serve the three compression chambers contained in the crank case. The connections to the crank case are best shown in Fig. 5. Considering branch manifold 65 to the right of Fig. 5, it will be seen that passage 66 opens into the end of the crank case adjacent ported wall 26, while passage 67 opens into the portion of the crank case between ported walls 27 and 28. Considering the branch manifold to the left of Fig. 5, it will be seen that passage 66 opens into the portion of the crank case between ported walls 29 and 30, while passage 67 opens into the end of the crank case adjacent ported wall 31.

Uniform charging is important whether the charge be a carbureted mixture or only air, but uniformity is more difficult of attainment with a carbureted mixture because the fuel particles (never completely vaporized) will be thrown off by centrifugal force if the mixture is turned around sharp corners, and the mixture will also vary if it passes through unequal passages on its way to the several compression chambers. According to my invention the passages in manifold 58 and branch manifolds 65 are equally curved and proportioned to divide the mixture evenly and to compel all the streams to travel the same distance through courses of the same shape and size. These passages give all parts of the mixture a uniform swirling motion and distribute the mixture evenly to all the compression chambers under the pressure of blower 53. Also, due to this construction, the high velocity stream from the blower acts as a cushion in case a back-fire occurs in the inlet manifold.

Figure 4:
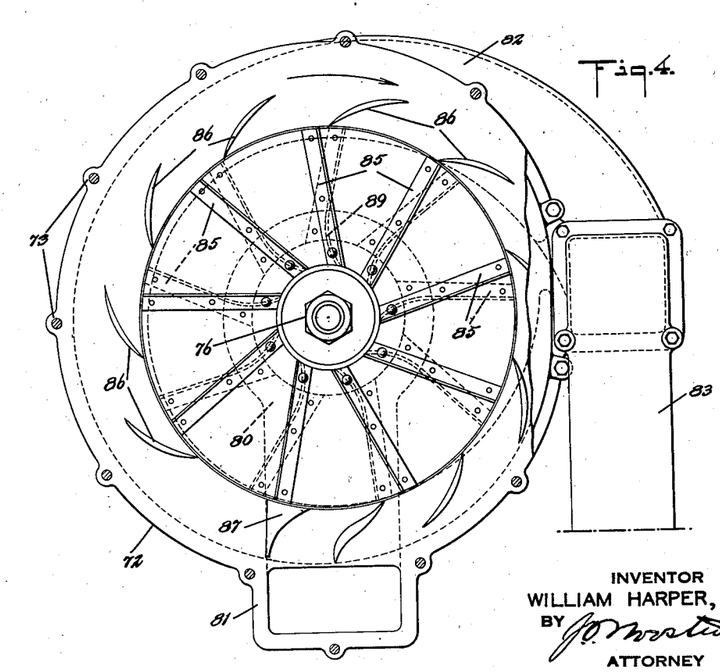
Fig. 4 is a vertical section through the blower, taken on line 4—4 of Fig. 5.

The blower may be of any suitable construction which will reasonably maintain its pressure curve at varying speeds, but I prefer the two-stage centrifugal blower shown in Figs. 4 and 5 as it embodies a number of important advantages in the combination of this invention. In the form illustrated this blower casing comprises an inner plate 69 mounted on the engine frame, an outer plate 70 carrying a central air inlet funnel 71, and an annular peripheral flange 72 which is clamped between the two plates by assembling bolts 73. Crank shaft 3 extends through the center of plate 69 and carries disc or rotor 74 which is secured to the crank shaft by hub 75 and lock nut 76. Disc 74 is in the same plane as flange 72 and the adjacent peripheral edges of the disc and flange are beveled and in close running contact with each other, being separated by an annular slot which is beveled outwardly toward the periphery of plate 69 and measures about $\frac{1}{32}$ inch from disc to flange.

The outer plate 70 of the blower is shaped to form a flat spiral chamber 78 which increases in area in a clockwise direction as viewed in Fig. 4, this being the direction of rotation of disc 74, and terminates at the large end in a depending passage 79 which mates with a corresponding depending passage 80 of plate 69. Flange 72 has a depending cut-out portion 81 to fit the juncture of passages 79 and 80. Passage 80 opens into the central portion of plate 69 adjacent the hub. Plate 69 is also shaped to form a flat spiral chamber 82 which increases in a clockwise direction as viewed in Fig. 4 and terminates at the large end in a downwardly directed pipe 83 which is connected to air main 54 leading to the carbureters.

A plurality of impeller blades 85 are mounted on both sides of disc 74. These blades are in reasonably close contact with the dished walls of the respective plates 69 and 70 and extend out to the peripheral edge of disc 74. The stationary flange 72 carries a series of curved fins 86 on both sides, these fins being adjacent the periphery of disc 74 are curved to direct the radial blast of air through spiral chambers 78 and 82. The flange also has a curved baffle 87 adjacent the large end of chamber 78 to direct the blast of air through passages 79 and 80.

Fresh air enters the low pressure side of the blower through the mouth of funnel 71 which is preferably covered with a fine-mesh screen 88 to exclude dirt. The air drawn in by the first stage impeller blades is swirled outwardly in a radial direction and propelled through spiral chamber 78 under high velocity, thence through passages 79 and 80 to the center of the high pressure side of the blower where it is picked up by the second stage impeller blades and whirled through spiral chamber 82, outlet pipe 83, air main 54 and branch pipes 55 into carburetors 56.

The impeller blades 85 of each stage are set at angles calculated to develop maximum air velocity. In the form shown, the blades of the first stage are approximately tangent to the center of rotation, while the blades of the second stage are more nearly tangent to the hub and have their inner ends 89 sloping gradually toward the hub to scoop up the air and accelerate the velocity. The function of the tapered slot between flange 72 and disc 74 is analogous to that of a Venturi throat, air from the first stage being trapped in this slot, swirled around by the rotation of the disc and injected against the higher pressure air in the second stage, increasing the pressure in the second stage while preventing leakage from the high to the low pressure stage.

The mixture from the carburetors passes under high velocity through pipes 57 into inlet manifold 58 where it divides equally through passages 63 and 64 and enters the crank case through passages 66 and 67 of branch manifolds 65 as previously described. In this way the mixture is injected into compression chambers 43, 44, etc., under high velocity whenever the associated inlet ports 32, 42 open at the proper point in the cycle.

I have explained that the spaced escapement ports 18 of cylinder 2 open into ducts 19 and that the upper ends of ducts 19 are connected by pipes 21 to one end of supercharging chamber 22, and it will be observed from Fig. 6 that similar parts are associated with opposed cylinder 2' and identified by similar reference numerals with primes affixed thereto. Also, since the structure and operation are the same for all six cylinders, it will be evident that the engine has six supercharging chambers and associated parts corresponding with the parts already described and about to be described in connection with opposed cylinders 2 and 2'.

The connected supercharging chambers 22 and 22' shown in Fig. 6 are for supercharging cylinders 2 and 2'. These chambers have a common central horizontal partition 90 which is spaced from the outer edges so as to divide chamber 22 into connected upper and lower passages 91 and 92 of elongated convoluted form, and chamber 22' into similar passages 91' and 92'. At the juncture of the upper passages 91 and 91' there is a common exhaust port 93 which opens into exhaust passage or manifold 94 which has a funnel 95 and is opened and closed by rotary spool valve 96 having ports 97. The central portion 98 of partition 90, beneath exhaust port 93, is curved downwardly to direct gases from the supercharging chambers through restricted openings 99 and 99' into compression chamber 43. The upper supercharging passage 91 has a vertical baffle plate 100 adjacent the inner end, thus separating the opposed ports 101 which lead into said passage from pipes 21 and preventing opposition of the two columns of high pressure exhaust gas in supercharging. The lower passages 92 and 92' have a common vertical baffle plate 102 which divides the charge between openings 99 and 99' at the top of compression chamber 43 and increases the supercharging efficiency.

Rotary valve 96 is mounted on shaft 104 as by means of Woodruff keys 105 which engage in elongated slot 106 in the valve and permit the valve to expand and contract. Shaft 104 extends across the engine and carries two other similar valves having ports arranged to control the exhaust from the supercharging chambers of the other cylinders. Shaft 104 is mounted in bearings 107 containing oil packing glands 108 and is driven by crank shaft 3 through a train of gears 109 as shown in Fig. 5. The timing of the rotary valves will be described later in considering the operation of the engine.

The piston 5 has a nozzle-shaped deflector 110 on the head which is shaped to provide shallow grooves 112 on opposite sides in position to open escapement ports 18 as shown in Figs. 1 and 7. Ports 18 are opened for a short period by grooves 112 at the beginning of exhaust and are closed as the piston crosses bottom dead center. Ports 18 are also opened by grooves 112 for an instant as the piston starts up on the compression stroke. The size of ports 18, and the periods during which they remain effective, may vary within wide limits and they may receive exhaust gas during the greater part of its pressure drop.

When ports 18 are opened at the point of exhaust some high pressure gas passes into pipes 21 and enters supercharging chamber 22 through port 101 at the inner end of passage 91. Supercharging chambers 22 and 22' have previously been filled with fresh gas, admitted to compression chamber 43 through cooperating ports 32, 42 and 32', 42' and thence directed by the blower pressure into the supercharging chambers through openings 99 and 99'. At this time, the piston having moved further down the stroke and closed escapement port 18, and the exhaust pressure in the cylinder having been relieved through main exhaust ports 16, and the piston having then uncovered inlet ports 12, the total charge of fresh gas in compression chamber 43 is transferred to the working cylinder through by-pass 13. This charge has an initial pressure sufficient to overcome the back pressure remaining in the cylinder, which can be controlled by adjustment of relief valves 23. The same operations take place at the same time with respect to cylinder 2'. Supercharging chambers 22 and 22' and the restricted openings 99 and 99' leading into compression chamber 43 are so constructed that the incoming exhaust gas, admitted through ports 101 and 101' at the upper inner ends of the supercharging chambers, is not diffused into the fresh gas, but acts as a ram against the whole column of fresh gas.

As the cylinder is then more than completely filled with fresh gas, there is a tendency for this fresh gas to leak out of exhaust port 16. However, this condition is prevented since, when the piston starts outward the ports 18 are again opened by piston grooves 112 and, as a greater pressure still remains in ducts 19 than in the working cylinder, some of the exhaust gas in these ducts is injected back into the working cylinder through ports 18. The nozzle-shaped deflector 110 on the piston head causes this exhaust gas to spread out and directs it so that it bucks the column of fresh gas away from exhaust ports 16 and then passes out through exhaust ports 16 in place of fresh gas while the piston starts its outward or compression stroke.

On its outward stroke the piston covers inlet ports 12 and has covered about two-thirds of escapement ports 18 when cooperating crank case ports 32, 42 open and admit a charge of fresh gas under high velocity to compression chamber 43. At the same time ports 97 of rotary valve 96 open the common exhaust port 93 at the juncture of supercharging passages 91 and 91', thus permitting the residual exhaust gases in the supercharging chambers to escape through exhaust manifold 94, this discharging of the exhaust gases being accelerated by the inrushing column of fresh gas. When the piston has completed its outward or compression stroke, and has traveled about one-half inch toward the bottom, inlet ports 32, 42 close and rotary valve 96 also closes. In the operation described above the piston preferably covers escapement ports 18 only after it has uncovered about 30% of inlet port 12.

The invention provides means for simultaneously throttling all the supercharging chambers and for throttling the fuel supply in timed relation therewith. The supercharging chambers are cut in and out by means of a slidable valve or grid 114 which is best shown in Figs. 5 and 10. This grid is slidably mounted between the upper ends of the compression chambers and the bottom of the supercharging chambers and has a lever 115 at one end by which it may be moved to the right or left as viewed in Fig. 5. The grid has transverse slots 116 and 116' adapted to register with openings 99 and 99' at the top of compression chamber 43 and has other similar slots adapted to register with the openings at the top of the other compression chambers. In the position shown in Fig. 6 the slots 116 and 116' are in registry with openings 99 and 99', but by sliding the grid toward the left in Fig. 6 the openings 99 and 99' may be closed to any desired extent, the corresponding openings of the other compression chambers being closed at the same time. In this way the supercharging chambers may all be throttled at the same time or may be cut out entirely as may sometimes be desirable when starting the engine.

In the dual control of Fig. 10, grid 114 and carburetor butterfly valve 117 are wide open. The lever system of Fig. 10 is arranged to close grid 114 before closing valve 117 and to open valve 117 before opening grid 114. To cut out the supercharging effect, the handle of lever 118 is lowered, thereby turning the lever about its pivot 119 and raising arm 120 which is connected to the lever by slot and pin connection 121. Lever 122, pivoted to arm 120 at 123, is thereby moved in a counter-clockwise direction about its pivot 124, and arm 125 which is pivoted at 126 to the upper end of lever 122 is thereby moved to the left in Fig. 10. Grid 114 is operated by lever 127 which is pivoted to the frame at 128 and is connected to grid 114 by slot and pin connection 129. The upper end of lever 127 has a pin 130 which moves freely in slot 131 in the end of arm 125, and a spring 132 attached to the engine frame and tending to close grid 114. Hence, as arm 125 moves to the left, spring 132 moves lever 127 in a counter-clockwise direction thereby moving grid 114 to the fully closed position against stop 133.

The lower end of arm 120 has a slot 135 containing pin 136 which is secured to the lower end of lever 137 operating carburetor valve 117. During the upward movement of arm 120, slot 135 moves up until its lower edge engages pin 136, at which time grid 114 is fully closed, whereupon continued upward movement of arm 120 causes lever 137 to move in a counter-clockwise direction and close carburetor valve 117 against the tension of spring 138. During this continued upward movement of arm 120, arm 125 continues to move toward the left until the right-hand edge of slot 131 engages pin 130 of arm 127 which has already come to rest against stop 133. Although Fig. 10 shows only one carburetor it will be understood that, where two or more carburetors are employed, they are all controlled by lever 118 through arm 120 and associated connections to the carburetor valves as described above. Also, it will be understood that carburetor valve 117 is never completely closed but is adjusted to pass a predetermined minimum amount of carbureted mixture in the so-called "closed" position.

In order to open carburetor valve or valves 117 and grid 114, the handle of lever 118 is raised, thereby lowering arm 120 and permitting spring 138 to turn lever 137 in a clockwise direction until it engages stop 140, at which time valve or valves 117 are fully opened. During this movement arm 125 moves to the right but, due to the lost motion between arm 125 and lever 127, spring 132 holds grid 114 closed until the left-hand edge of slot 131 engages pin 130. When this occurs, carburetor valve or valves 117 being then open, arm 125 moves lever 127 in a clockwise direction and opens grid 114. It will be evident that, while closure of grid 114 cuts out supercharging, it still leaves the exhaust gas to oscillate in ducts 19, 19' and the nozzle-shaped piston head to prevent loss of charge through exhaust port 16, 16'.

In the engine illustrated, the supercharging chambers and associated parts including exhaust manifold 94 and the rotary valve mechanism are constructed in a unit which is mounted on the top of the engine as by bolts 142. If supercharging is not desired, the supercharging unit may be removed and replaced by exhaust gas traps such as 143 shown in Figs. 11 and 12. This trap contains a plurality of blind chambers 144, 145, etc., separated by partitions 146, there being a separate trapping chamber for each cylinder. In the engine illustrated, trap 143 has three chambers, one for each of the cylinders shown for example in the lower half of Fig. 3, while another similar trap with three chambers is provided for the cylinders shown in the upper half of Fig. 3. Each trapping chamber in Fig. 11 has spaced ports 147 aligned with ducts 19 connected to escapement ports 18 of one cylinder, while the trapping chambers on the other side of the engine have similar ports aligned with ducts 19' which are connected to escapement ports 18' as previously described. In operating the engine, high pressure exhaust gas from each explosion is trapped in chambers 144, 145, etc., and is returned to the cylinders after charging, the returned gas bucking the fresh gas away from exhaust ports 16 and then passing out through exhaust ports 16 in the manner previously described. This alternate trapping and returning of exhaust gas, with or without supercharging, effects a saving of fifty to seventy-five percent of fuel over common two-cycle practice. The dimensions of the surge chambers may vary widely in any given engine but are preferably twenty per cent or more of the displacement of the working elements, and in any case the shape and dimensions should be such that the surge of exhaust gas will be as violent as possible in both directions under normal working conditions.

The herein described method of dividing the high pressure exhaust gas discharged from a cylinder or cylinders enables the engine to be muffled without appreciable loss of power. The first surge of high pressure exhaust gas from each explosion is muffled against the fresh charge in the supercharging chambers and the residual discharge through manifold 94 occurs in short muffled puffs. It is this first surge of exhaust gas which causes the sharp report after each explosion in an ordinary engine and hence with this surge muffled the main exhaust through exhaust ports 16, 16' and manifolds 17, 17' will produce much less noise than heretofore. This noise may be reduced to a minimum by connecting mufflers of any suitable type to exhaust manifolds 17 and 17'. Such mufflers will exert a minimum back pressure which is overcome by the supercharging pressure and by the pressure of the exhaust gas which is returned to the cylinders through escapement ports 18 after charging.

Figs. 5, 6 and 8 show as much of the lubricating system as is necessary to a complete understanding of the invention. The piston lubricating means includes an adjustable screw 149 extending through supercharging chamber 22 and by-pass channel 13, having a transverse oil duct 150 adjacent the downwardly sloping bottom wall of the supercharging chamber and a connected vertical oil duct 151 opening into the cylinder. This screw may be adjusted by removing cap 152 at the top of the supercharging chamber. Similar screws are provided for each of the other cylinders. It will be evident that lubricating oil in the charging mixture will collect in the supercharging chambers and will flow down through ducts 149 and 150 into the cylinders and onto the pistons. The pistons have upper and lower oil grooves 153, terminating short of escapement ports 18, whereby oil trapped in these grooves spreads over the entire piston surface and works down through inlet port 15 and is directed by adjacent baffle 154 onto wrist pin bearing 155. The oil in the interior of the piston works through a small duct or ducts 157 onto the lower surface of the cylinder, being retained in the piston until guided into said ducts by ridge 158 on the inner edge of the piston. Baffle 154 also intercepts oil thrown through the piston by the crank shaft as well as the oil carried by the ingoing mixture, reversing the direction of the mixture and thereby throwing the oil out of the mixture.

Crank shaft roller bearings 33 are lubricated by oil which is fed through suitable channels into small wells in the heads of oil hole bolts 159 and drops through vertical ducts 160 onto the bearings. The crank pins 161 of the crank shaft are lubricated by means of oil trapping pockets or gutters 162 which are mounted on both sides of the non-ported crank shaft discs 45, 46 and 47 as shown in Figs. 5 and 8. These gutters have outstanding arcuate flanges constituting about one-third of a circle and are secured to the crank discs in any suitable manner as by screws 163. At the center of each arcuate gutter 162 an oil hole 164 is drilled through the crank disc in position to register with an oil hole 165 drilled through the opposite crank pin 161 to the periphery thereof. The radius of each arcuate gutter 162 is shorter than the radius of the disc on which it is mounted, so that the center of the gutter adjacent oil hole 164 is further away from the center of the disc than any other point on the gutter. Hence, oil caught in the gutters will be thrown by centrifugal force to the center of the gutters and through oil holes 164 and 165, lubricating the crank pins. The oil collected by the gutters enters the crank case with the charging mixture and collects on discs 45, 46 and 47 from which it is thrown into the gutters by centrifugal force. The oil feeding system includes any suitable pump which may be operated by shaft 166 geared to valve shaft 104 as shown in Figs. 1 and 5.

The ignition system includes two or more spark plugs 168 and 169 which are set in recesses arranged at draining angles in the head of each cylinder to enable liquid fuel and oil to drain off into the cylinder.

Plug 168 is preferably any suitable type of "cold" plug selected for its rapid heat dissipating properties. The particular plug 168 shown in Fig. 6 is a B. G. Hornet No. 4 having a small mica insulator 170, although this particular plug is shown simply for purposes of illustration as any other plug having good heat dissipating properties may be used equally well. Plug 168 has its spark gap extending well into the combustion chamber of the cylinder head and is preferably pointed toward the center of the combustion space so that ignition from this plug will spread instantly throughout the entire compressed charge. The walls of the cylinder head are preferably flared from the recess containing the plug toward the cylinder barrel to facilitate spreading of the flame.

Plug 169 is preferably selected for its good insulating properties, the particular plug 169 shown for purposes of illustration in Fig. 6 being a Robert Bosch Midget 12 mm. plug having a so-called petticoat porcelain insulator 172 which is a good high tension insulator. This plug may of course be replaced by any other type of plug having good insulating properties.

Plug 169 is shielded in a recess 176 having a restricted orifice or passage 177 which may be formed by an overhanging lip on the wall of the cylinder head and which connects recess 176 with the combustion chamber. Passage or orifice 177 is preferably set at such an angle that its entrance is adjacent the water-jacketed or other cooled wall of the cylinder, this being the region of the combustion chamber where the radiant heat is at a minimum.

Passage or orifice 177 is likewise disposed at such an angle to recess 176 that the wall of the passage intercepts and absorbs the radiant heat of combustion which enters the passage and thereby prevents such heat from directly impinging on and overheating spark plug 169 which would become excessively hot if mounted in a more exposed position. The wall of passage 177, like the wall of the cylinder, is made of heat absorbing material such as cast iron and does not reflect heat especially since said wall is usually coated with carbon.

Spark plugs 168 and 169 of one cylinder, and spark plugs 168' and 169' of the corresponding opposed cylinder, all spark simultaneously as hereinafter described. Ignition from shielded plug 169 will not be as rapid as from exposed plug 168. If plug 168 is fouled when the engine is started, then plug 169, which sparks simultaneously with plug 168, will ignite the charge while warming up the engine until plug 168 has become hot enough to burn off the oil or carbon which has caused the fouling.

Scavenging of recess 176 is accomplished automatically due to the position of plug 169 in said recess. After each explosion the pressure in recess 176 drops to the same point as the pressure in the cylinder and most of the exhaust gas flows out of said recess. On the following compression stroke, the compressed fresh mixture forces the residual exhaust gas in recess 176 back to the base of the plug. The points of the spark gap are close enough to passage 177, and the clearance back of the points is sufficient, to allow such residual exhaust gas to be pushed back away from the points on each compression stroke.

The spark plugs of each pair of opposed cylinders may be connected in series or in parallel and may be functioned by any suitable source of timed interrupted current such as a dual ignition magneto or a battery controlled, for example, by distributor or breaker 179 geared to valve shaft 104. A suitable ignition system for this purpose is disclosed in my Patents Nos. 2,025,202 and 2,025,203 of December 24, 1935.

I have illustrated my invention in its application to a particular engine without, of course, limiting it to that type of engine, and in constructing an engine according to my invention it will be evident that numerous changes may be made without departing from the scope and spirit of the appended claims.

This application is a continuation in part of my application Serial No. 509,947, filed January 20, 1931.

The words "charge" and "fluid" as used in the claims mean either a carbureted mixture or air into which the liquid fuel will be injected after compression in the combustion space, and "fluid pressure reservoir" means any suitable reservoir for carbureted mixture or air under pressure.

The invention claimed is:

1. Method of operating a combustion engine having a cylinder, a piston and inlet and exhaust means, which comprises opening said inlet to a column of charging fluid, discharging high pressure exhaust gas behind said column to supercharge said cylinder, returning a portion of said exhaust gas to the supercharged cylinder and directing the returned exhaust gas through said exhaust means.

2. Method of preventing loss of charge in a combustion engine having a combustion space with inlet and exhaust ports and an explosion driven member controlling said ports to admit charge through said inlet port before closing said exhaust port, which comprises charging said combustion space during the inward stroke of said member and injecting exhaust gas into said combustion space against said charge and out through the open exhaust port in advance of the outward stroke of said member.

3. Method of preventing loss of charge in a combustion engine having a combustion space with inlet and exhaust ports and means controlling said ports to admit a charge through said inlet port before closing said exhaust port, which comprises charging said combustion space and injecting high pressure exhaust gas into said combustion space against said charge and out through said exhaust port.

4. Method of preventing loss of charge in a combustion engine having a combustion space with inlet and exhaust ports and means controlling said ports to admit a charge through said inlet port before closing said exhaust port, which comprises trapping high pressure exhaust gas from a preceding explosion, charging said combustion space, and injecting said trapped exhaust gas into said combustion space against said charge and out through said exhaust port.

5. Method of muffling the exhaust from a combustion engine having a combustion space and an explosion driven member which comprises discharging the first surge of high pressure exhaust gas from said combustion space against a confined column of elastic fluid after each explosion and then discharging the remaining exhaust gas from said combustion space.

6. Method of muffling the exhaust from a combustion engine having a combustion space and an explosion driven member which comprises dividing the high pressure exhaust gas from said combustion space into separate streams after each explosion, trapping one of said streams of exhaust gas in an enclosed chamber, discharging the other stream of exhaust gas through a muffler and discharging exhaust gas from said chamber.

7. A combustion engine having a combustion space and inlet and exhaust ports therefor, means controlling said ports to admit charge through said inlet port before closing said exhaust port, and means for injecting high pressure exhaust gas into said combustion space in a direction to buck the charge in said combustion space away from said exhaust port before closing said exhaust port.

8. A combustion engine having a combustion space and inlet and exhaust ports therefor, means controlling said ports to admit charge through said inlet port before closing said exhaust port, and means for injecting high pressure exhaust gas into said combustion space against said charge and out through said exhaust port.

9. A combustion engine having a combustion space and inlet and exhaust ports therefor, means controlling said ports to admit charge through said inlet port before closing said exhaust port, means for trapping high pressure exhaust gas from a preceding explosion, means for charging said combustion space after each explosion, and means for injecting said trapped exhaust gas into said combustion space in a direction to buck said charge away from said exhaust port before closing said exhaust port.

10. A combustion engine having a combustion space and inlet and exhaust ports therefor, an explosion driven member, means for charging said combustion space, an escapement port in said combustion space and a chamber connected thereto for trapping exhaust gas, and means for opening said escapement port at the point of exhaust to admit high pressure exhaust gas to said chamber and after charging said combustion space to discharge said exhaust gas against the charge in said combustion space in a direction to buck said charge away from said exhaust port.

11. A combustion engine comprising a combustion space and inlet and exhaust ports therefor, an explosion driven member controlling said ports and adapted to open said inlet port before closing said exhaust port, a fluid pressure reservoir adapted to charge said combustion space through said inlet port, an escapement port in said combustion space and a chamber connected to said escapement port to trap high pressure exhaust gas, said explosion driven member being shaped to open said escapement port after an explosion to admit high pressure exhaust gas to said chamber and after charging said combustion space to inject said exhaust gas into said combustion space against said charge and out through said exhaust port.

12. A combustion engine comprising a combustion space and inlet and exhaust ports therefor, an explosion driven member controlling said ports and adapted to open said inlet port before closing said exhaust port, a fluid pressure reservoir adapted to communicate with said inlet port to charge said combustion space, spaced escapement ports in said combustion space and a chamber connected to said escapement ports to trap high pressure exhaust gas, said explosion driven member being shaped to open said escapement ports after an explosion to admit high pressure exhaust gas to said chamber and after charging said combustion space to inject said exhaust gas into said combustion space against said charge and out through said exhaust port.

13. A combustion engine having a combustion space and inlet and exhaust means therefor, an explosion driven member, a fluid pressure reservoir for charging said combustion space through said inlet, and means for connecting said reservoir at one end to high pressure exhaust gas and at the other end to said inlet to supercharge said combustion space.

14. A combustion engine having a combustion space and inlet and exhaust means therefor, an explosion driven member, a fluid pressure reservoir for charging said combustion space through said inlet, a supercharging chamber connected to said reservoir, means for admitting high pressure exhaust gas to said supercharging chamber to supercharge said combustion space, and means for discharging exhaust gas from said supercharging chamber.

15. A combustion engine having a combustion space and inlet and exhaust means therefor, an explosion driven member, a fluid pressure reservoir for charging said combustion space through said inlet, a supercharging chamber connected to said reservoir, means for admitting high pressure exhaust gas to said supercharging chamber to supercharge said combustion space, and means for disconnecting said supercharging chamber from said reservoir.

16. A combustion engine comprising a cylinder, a piston, inlet and exhaust means, a fluid pressure reservoir adapted to charge said cylinder through said inlet, and means controlled by said piston for connecting said reservoir at one end to high pressure exhaust gas and at the other end to said inlet to supercharge said cylinder.

17. A combustion engine comprising a cylinder, a piston, inlet and exhaust means, a fluid pressure reservoir adapted to charge said cylinder through said inlet, and means controlled by said piston for simultaneously connecting said reservoir at one end to high pressure exhaust gas and at the other end to said inlet to supercharge said cylinder.

18. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, and means for discharging exhaust gas from said reservoir.

19. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, and a blower for accelerating the supercharge.

20. A combustion engine comprising a cylinder, a piston, inlet and exhaust means, a fluid pressure reservoir adapted to charge said cylinder through said inlet, a fluid supply source adapted to charge said reservoir, a blower behind said supply source, and means for connecting said reservoir at one end to high pressure exhaust gas and at the other end to said inlet to supercharge said cylinder.

21. A combustion engine comprising a cylinder, a piston, inlet and exhaust means, a fluid pressure reservoir, means for connecting said inlet to said reservoir to charge said cylinder, means for admitting high pressure exhaust gas from said cylinder to said reservoir to supercharge said cylinder, means for returning exhaust gas from said reservoir to said cylinder, and means controlled by said piston for expelling said returned exhaust gas through said exhaust means.

22. A combustion engine comprising a cylinder, a piston, inlet and exhaust means, a fluid pressure reservoir adapted to communicate with said inlet to charge said cylinder, and spaced escapement ports in said cylinder connected to said reservoir and adapted to be uncovered by said piston to discharge high pressure exhaust gas against said fluid to supercharge said cylinder.

23. A combustion engine comprising a cylinder, a piston, inlet and exhaust means, a fluid pressure reservoir adapted to communicate with said inlet to charge said cylinder, spaced escapement ports in said cylinder connected to said reservoir, and a deflector on the piston head having grooves adapted to uncover said escapement ports.

24. A combustion engine comprising a cylinder having inlet and exhaust ports, a piston adapted to open and close said ports, a fluid pressure reservoir adapted to communicate with said inlet port to charge said cylinder, spaced escapement ports in said cylinder of less area than said exhaust port, and ducts connecting said escapement ports to said reservoir to admit high pressure exhaust gas thereto to supercharge said cylinder.

25. A combustion engine comprising a cylinder having inlet and exhaust ports, a piston adapted to open and close said ports, a fluid pressure reservoir adapted to communicate with said inlet port to charge said cylinder during the inward stroke of said piston, spaced escapement ports in said cylinder adapted to be uncovered in predetermined positions of said piston, and ducts connecting said escapement ports to said reservoir, the piston head containing grooves arranged to uncover said escapement ports during the inward stroke to discharge high pressure exhaust gas against the fluid in said reservoir and during the outward stroke to discharge exhaust gas from said ducts in front of the main exhaust.

26. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, and means for relieving excess exhaust gas pressure.

27. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, an exhaust passage communicating with said reservoir, and means for opening said exhaust passage to discharge exhaust gas from said reservoir.

28. A combustion engine comprising a cylinder, a piston, inlet and exhaust means and an exhaust manifold, a fluid pressure reservoir adapted to charge said cylinder through said inlet, a duct communicating with said cylinder and connected to said reservoir to discharge high pressure exhaust gas behind the fluid in said reservoir, and means including a pressure relief valve connecting said duct to said exhaust manifold.

29. A combustion engine comprising a cylinder, a piston, inlet and exhaust means and an exhaust manifold, a fluid pressure reservoir adapted to charge said cylinder through said inlet, a duct communicating with said cylinder and connected to said reservoir to discharge high pressure exhaust gas behind the fluid in said reservoir, means including a pressure relief valve connecting said duct to said exhaust manifold, a second exhaust means between said duct and said reservoir, and means for opening said second exhaust means to discharge exhaust gas from said reservoir after supercharging.

30. A combustion engine comprising a cylinder, a piston, inlet and exhaust means, a fluid pressure reservoir adapted to charge said cylinder through said inlet, a convoluted supercharging chamber between said cylinder and said reservoir, and means for admitting high pressure exhaust gas to said chamber to supercharge said cylinder.

31. A combustion engine comprising a cylinder, a piston, inlet and exhaust means, a fluid pressure reservoir adapted to charge said cylinder through said inlet, a convoluted supercharging chamber connected to said reservoir, means for admitting high pressure exhaust gas to said supercharging chamber to supercharge said cylinder, and means for discharging exhaust gas from said supercharging chamber.

32. A combustion engine comprising a cylinder, a piston, inlet and exhaust means, a fluid pressure reservoir adapted to charge said cylinder through said inlet, a convoluted supercharging chamber connected to said reservoir, means for admitting high pressure exhaust gas to said supercharging chamber to supercharge said cylinder, a discharge valve connected to said supercharging chamber, and means for opening said valve to discharge said exhaust gas after supercharging.

33. A combustion engine comprising a cylinder, a piston, inlet and exhaust means, a fluid pressure reservoir adapted to charge said cylinder through said inlet, a convoluted supercharging chamber connected to said reservoir, means for admitting high pressure exhaust gas to said supercharging chamber to supercharge said cylinder, means for relieving excess exhaust gas pressure, a discharge valve connected to said supercharging chamber, and means for opening said valve to discharge said exhaust gas after supercharging.

34. A combustion engine comprising a cylinder having inlet and exhaust means, a crank case supporting said cylinder, a crank shaft in said crank case, a piston in said cylinder connected to said crank shaft, means for charging said crank case, means controlled by said piston for charging said cylinder through said inlet, a supercharging chamber connected to said crank case, means for admitting high pressure exhaust gas to said supercharging chamber to supercharge said cylinder, an exhaust passage connected to said supercharging chamber for discharging said exhaust gas, a rotary valve for opening and closing said exhaust passage, and means for operating said valve to open said exhaust passage after supercharging.

35. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, an exhaust passage communicating with said reservoir, a rotary ported valve cooperating with said exhaust passage, and means for operating said valve to open said exhaust passage after supercharging.

36. A combustion engine comprising a cylinder, a piston, inlet and exhaust means, a fluid pressure reservoir adapted to charge said cylinder through said inlet, means for connecting said reservoir at one end to high pressure exhaust gas and at the other end to said inlet to supercharge said cylinder, an exhaust passage communicating with said reservoir, a rotary valve shaft adjacent said exhaust passage, and a ported valve slidably keyed to said shaft and cooperating with said exhaust passage to discharge exhaust gas from said reservoir.

37. A combustion engine comprising a plurality of cylinders, pistons, inlet and exhaust means, separate compression chambers for charging said cylinders through said inlets, supercharging chambers connected to said compression chambers, means for admitting high pressure exhaust gas to said supercharging chambers to supercharge said cylinders, exhaust passages communicating with said supercharging chambers, rotary ported valves cooperating with said exhaust passages, and means for operating said valves to open said exhaust passages after supercharging.

38. A combustion engine comprising a plurality of cylinders, pistons, inlet and exhaust means, separate compression chambers for charging said cylinders through said inlets, supercharging chambers connected to said compression chambers, means for admitting high pressure exhaust gas to said supercharging chambers to supercharge said cylinders, exhaust passages communicating with said supercharging chambers, a rotary valve shaft adjacent said exhaust passages, bearings supporting said shaft between said exhaust passages, and ported valves slidably keyed to said shaft between said bearings and cooperating with said exhaust passages to discharge exhaust gas from said supercharging chambers.

39. A combustion engine comprising a plurality of cylinders, pistons, and inlet and exhaust means, separated compression chambers for charging said cylinders through said inlets, and means for connecting said compression chambers at one end to high pressure exhaust gas and at the other end to said inlets to supercharge said cylinders.

40. A combustion engine comprising a cylinder having inlet and exhaust ports, a crank case supporting said cylinder, a crank shaft in said crank case, a piston in said cylinder connected to said crank shaft, means for charging said crank case, and means controlled by said piston for connecting said crank case at one end to high pressure exhaust gas and at the other end to said inlet port to supercharge said cylinder.

41. A combustion engine comprising a cylinder having inlet and exhaust ports, a crank case supporting said cylinder, a crank shaft in said crank case, a piston in said cylinder connected to said crank shaft, means for charging said crank case, means controlled by said piston for connecting said crank case at one end to high pressure exhaust gas and at the other end to said inlet port to supercharge said cylinder, and means for discharging said exhaust gas.

42. A combustion engine comprising a cylinder having inlet and exhaust ports, a crank case supporting said cylinder, a crank shaft in said crank case, a piston in said cylinder connected to said crank shaft, means for charging said crank case, means controlled by said piston for opening said inlet port to said crank case to charge said cylinder, and an escapement port in said cylinder communicating with said crank case and adapted to be uncovered by said piston to supercharge said cylinder.

43. A combustion engine comprising a cylinder having inlet and exhaust ports, a crank case supporting said cylinder, a crank shaft in said crank case, a piston in said cylinder connected to said crank shaft, means for charging said crank case, means controlled by said piston for opening said inlet port to said crank case to charge said cylinder, a supercharging chamber connected to said crank case, and means for admitting high pressure exhaust gas to said supercharging chamber to supercharge said cylinder.

44. A combustion engine comprising a cylinder having inlet and exhaust ports, a crank case supporting said cylinder, a crank shaft in said crank case, a piston in said cylinder connected to said crank shaft, means for charging said crank case, means controlled by said piston for opening said inlet port to said crank case to charge said cylinder, a supercharging chamber connected to said crank case, means for admitting high pressure exhaust gas to said supercharging chamber to supercharge said cylinder, and means for disconnecting said supercharging chamber from said crank case.

45. A combustion engine comprising a cylinder having inlet and exhaust ports, a crank case supporting said cylinder, a crank shaft in said crank case, a piston in said cylinder connected to said crank shaft, means for charging said crank case, means controlled by said piston for connecting said crank case at one end to high pressure exhaust gas and at the other end to said inlet port to supercharge said cylinder, and a blower for increasing the pressure in said crank case.

46. A combustion engine comprising a cylinder having inlet and exhaust ports, a crank case supporting said cylinder, a crank shaft in said crank case, a piston in said cylinder connected to said crank shaft, means for charging said crank case, means controlled by said piston for connecting said crank case at one end to high pressure exhaust gas and at the other end to said inlet port to supercharge said cylinder, means for discharging said exhaust gas, and a blower exerting pressure in said crank case to accelerate charging of said cylinder and discharging of said exhaust gas.

47. A combustion engine comprising opposed cylinders having inlet and exhaust ports, a crank case supporting said cylinders, a crank shaft in said crank case, pistons in said cylinders connected to said crank shaft, means for charging said crank case, means controlled by said pistons for opening said inlet ports to said crank case to charge said cylinders, and means for connecting high pressure exhaust gas to said crank case to supercharge said cylinders.

48. A combustion engine comprising opposed cylinders having inlet and exhaust ports, a crank case supporting said cylinders, a crank shaft in said crank case, pistons in said cylinders connected to said crank shaft, means for charging said crank case, means controlled by said pistons for opening said inlet ports to said crank case to charge said cylinders, means for connecting high pressure exhaust gas to said crank case to supercharge said cylinders, and means for discharging said exhaust gas.

49. A combustion engine comprising opposed cylinders having inlet and exhaust ports, a crank case supporting said cylinders, a crank shaft in said crank case, pistons in said cylinders connected to said crank shaft, means for charging said crank case, means controlled by said pistons for opening said inlet ports to said crank case to charge said cylinders, means for connecting high pressure exhaust gas to said crank case to supercharge said cylinders, means for returning exhaust gas to said cylinders, and means controlled by said pistons for expelling said returned exhaust gas through said exhaust ports.

50. A combustion engine comprising opposed cylinders having inlet and exhaust ports, a crank case supporting said cylinders, a crank shaft in said crank case, pistons in said cylinders connected to said crank shaft, means for charging said crank case, means controlled by said pistons for opening said inlet ports to said crank case to charge said cylinders, supercharging chambers having connected inner ends opening into said crank case, and spaced escapement ports in said cylinders connected to the outer ends of said supercharging chambers and adapted to be uncovered by said pistons to admit high pressure exhaust gas to said supercharging chambers.

51. A combustion engine comprising opposed cylinders having inlet and exhaust ports, a crank case supporting said cylinders, a crank shaft in said crank case, pistons in said cylinders connected to said crank shaft, means for charging said crank case, means controlled by said pistons for opening said inlet ports to said crank case to charge said cylinders, connected supercharging chambers opening into said crank case, spaced escapement ports in said cylinders connected to said supercharging chambers and adapted to be uncovered by said pistons to admit high pressure exhaust gas to said supercharging chambers, and means for disconnecting said supercharging chambers from said crank case.

52. A combustion engine comprising a plurality of cylinders, pistons, and inlet and exhaust means, separated compression chambers for charging said cylinders through said inlets, supercharging chambers connected to said compression chambers, means for admitting high pressure exhaust gas to said supercharging chambers to supercharge said cylinders, and means for discharging exhaust gas from said supercharging chambers.

53. A combustion engine comprising a plurality of cylinders having inlet and exhaust ports, a crank case supporting said cylinders and containing separated compression chambers for charging said cylinders through said inlet ports, a crank shaft in said crank case, pistons in said cylinders connected to said crank shaft, and means for discharging high pressure exhaust gas behind the fluid in said compression chambers to supercharge said cylinders.

54. A combustion engine comprising a plurality of cylinders having inlet and exhaust ports, a crank case supporting said cylinders and having ported walls forming separated compression chambers for charging said cylinders through said inlet ports, a crank shaft in said crank case carrying ported discs cooperating with said walls, pistons in said cylinders connected to said crank shaft, and means for discharging high pressure exhaust gas behind the fluid in said compression chambers to supercharge said cylinders.

55. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, means for charging said compression chambers, and means for discharging high pressure exhaust gas behind the fluid in said compression chambers to supercharge said cylinders.

56. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, means for charging said compression chambers, means for discharging high pressure exhaust gas behind the fluid in said compression chambers to supercharge said cylinders, and means for controlling the pressure of said exhaust gas.

57. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, a fluid supply source, means controlled by said discs for connecting said supply source to said compression chambers, supercharging chambers connected to said compression chambers, and means for admitting high pressure exhaust gas to said supercharging chambers to supercharge said cylinders.

58. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, a fluid supply source, means controlled by said discs for connecting said supply source to said compression chambers, supercharging chambers connected to said compression chambers, means for admitting high pressure exhaust gas to said supercharging chambers to supercharge said cylinders, and means for simultaneously throttling said supercharging chambers.

59. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, a fluid supply source, means controlled by said discs for connecting said supply source to said compression chambers, supercharging chambers connected to said compression chambers, means for admitting high pressure exhaust gas to said supercharging chambers to supercharge said cylinders, and means for discharging exhaust gas from said supercharging chambers.

60. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, a fluid supply source, means controlled by said discs for connecting said supply source to said compression chambers, a plurality of convoluted supercharging chambers each having one end connected to an individual compression chamber, and means for admitting high pressure exhaust gas to the other end of each supercharging chamber to supercharge said cylinders.

61. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into separated compression chambers for charging said cylinders through said inlet ports, a fluid supply source, means controlled by said discs for connecting said supply source to said compression chambers, a plurality of supercharging chambers each having one end connected to an individual compression chamber, means for admitting high pressure exhaust gas to the other end of each supercharging chamber to supercharge said cylinders, an exhaust manifold, and a rotary valve having ports adapted to connect said supercharging chambers with said exhaust manifold to discharge said exhaust gas after supercharging.

62. A combustion engine comprising a plurality of cylinders, pistons, and inlet and exhaust means, separated fluid pressure reservoirs adapted to charge said cylinders through said inlet means, a fluid supply source, and an inlet manifold having equal oppositely directed inlet passages connected to said supply source to divide the fluid into equal oppositely directed streams and equal branch passages connected to said reservoirs on opposite sides of said inlet passages.

63. A combustion engine comprising a plurality of cylinders, pistons, and inlet and exhaust means, separated fluid pressure reservoirs adapted to charge said cylinders through said inlet means, a fluid supply source, and an inlet manifold having equal oppositely directed inlet passages connected to said supply source to divide the fluid into equal oppositely directed streams and equal oppositely directed branch passages connected to said reservoirs on opposite sides of said inlet passages.

64. A combustion engine comprising a plurality of cylinders, pistons, and inlet and exhaust means, separated fluid pressure reservoirs adapted to charge said cylinders through said inlet means, a fluid supply source, and an inlet manifold having equal oppositely curved inlet passages connected to said supply source, a central portion, and equal curved branch passages at opposite ends of said central portion connected to said reservoirs.

65. A combustion engine comprising a plurality of cylinders, pistons, and inlet and exhaust means, separated fluid pressure reservoirs adapted to charge said cylinders through said inlet means, a fluid supply source, an inlet manifold having a central portion, opposite inlet passages connected to said supply source and opening into said central portion in opposite directions to direct equal streams of fluid toward the ends of said manifold, and equal oppositely directed branch passages at opposite ends of said manifold connected to said reservoirs.

66. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into spaced compression chambers for charging said cylinders through said inlet ports, cooperating ports in said crank case walls and said discs, a fluid supply source, and an inlet manifold having oppositely curved inlet passages connected to said supply source to divide the fluid into equal oppositely directed streams and branch passages connected to said crank case between said compression chambers.

67. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into spaced compression chambers for charging said cylinders through said inlet ports, cooperating ports in said crank case walls and said discs, a fluid supply source, and an inlet manifold having oppositely curved inlet passages connected to said supply source to divide the fluid into equal oppositely directed streams and equal oppositely curved branch passages connected to said crank case between said compression chambers.

68. A combustion engine comprising a plurality of cylinders having inlet and exhaust ports, a crank case supporting said cylinders, a crank shaft in said crank case, pistons in said cylinders connected to said crank shaft, spaced discs on said crank shaft in sealing contact with the walls of said crank case and dividing said crank case into spaced compression chambers for charging said cylinders through said inlet ports, cooperating ports in said crank case walls and said discs, a fluid supply source, an inlet manifold having a central portion, opposite inlet passages connected to said supply source and opening into said central portion in opposite directions to direct equal streams of fluid toward the ends of said manifold, and equal oppositely directed branch passages at opposite ends of said manifold connected to said crank case between said compression chambers.

69. A combustion engine comprising a cylinder, a piston, inlet and exhaust means, and a duct tangent to said cylinder and intersecting same to form an escapement port for the passage of exhaust gas between said cylinder and duct.

70. A combustion engine comprising a cylinder, a piston, inlet and exhaust means, and spaced parallel ducts tangent to said cylinder and intersecting same to form opposite escapement ports for the passage of exhaust gas between said cylinder and ducts.

71. A combustion engine comprising a combustion space and inlet and exhaust means therefor, an explosion driven member, a fuel supply, a fluid pressure reservoir for charging said combustion space through said inlet, a supercharging chamber connected to said reservoir, means for admitting high pressure exhaust gas to said supercharging chamber to supercharge said combustion space, and means for throttling said supercharging chamber and said fuel supply.

72. A combustion engine comprising a combustion space and inlet and exhaust means therefor, an explosion driven member, a fuel supply, a fluid pressure reservoir for charging said combustion space through said inlet, a supercharging chamber connected to said reservoir, means for admitting high pressure exhaust gas to said supercharging chamber to supercharge said combustion space, means for throttling said supercharging chamber and means for subsequently throttling said fuel supply.

73. A combustion engine comprising a combustion space and inlet and exhaust means therefor, an explosion driven member, a fuel supply, a fluid pressure reservoir for charging said combustion space through said inlet, a supercharging chamber connected to said reservoir, means for admitting high pressure exhaust gas to said supercharging chamber to supercharge said combustion space, means for disconnecting said supercharging chamber from said reservoir and means for subsequently throttling said fuel supply.

74. A combustion engine comprising a combustion space and inlet and exhaust means therefor, an explosion driven member, a fuel supply, a fluid pressure reservoir for charging said combustion space through said inlet, a supercharging chamber connected to said reservoir, means for admitting high pressure exhaust gas to said supercharging chamber to supercharge said combustion space, a valve for disconnecting said supercharging chamber from said reservoir, a throttle controlling said fuel supply, and a lever system having means for closing said valve and subsequently closing said throttle and means for opening said throttle and subsequently opening said valve.

75. Method of supercharging an internal combustion engine of the two-cycle type wherein fresh gaseous charging fluid is drawn into the crank case and compressed by the piston and thereafter delivered to the cylinder for compression and combustion, which comprises discharging a portion of the exhaust gas when near its maximum pressure against the fresh gaseous charging fluid in said crank case to increase the pressure and volume of the charge entering said cylinder, and discharging the remaining exhaust gas at a lower pressure.

76. Method of supercharging a two-cycle combustion engine having inlet and exhaust ports, wherein fresh charging fluid is drawn into the crank case and compressed by the piston and thereafter delivered to the cylinder for compression and combustion, which comprises discharging high pressure exhaust gas from said cylinder near the completion of the working stroke of the piston against the fresh charging fluid in said crank case to increase the pressure and volume of the charge, and injecting a portion of said exhaust gas back into the cylinder against the fresh charge and out through said exhaust port on the compression stroke of the piston.

77. Method of supercharging a two-cycle combustion engine having inlet and exhaust ports, wherein fresh gaseous charging fluid is drawn into the crank case and compressed by the piston and thereafter delivered to the cylinder for compression and combustion, which comprises discharging a portion of the exhaust gas from the engine when near its maximum pressure against the fresh gaseous charging fluid in said crank case to increase the pressure and volume of the charge entering said cylinder, discharging the remaining exhaust gas at a lower pressure, reinjecting a portion of said high pressure exhaust gas into the supercharged cylinder against the fresh charge and thence out through the exhaust port to buck said fresh charge away from the exhaust port and thereby prevent loss of charge after supercharging.

78. An internal combustion engine comprising a cylinder having inlet and exhaust ports, a crank case containing a crank shaft, a piston in said cylinder connected to said crank shaft, means for admitting fresh charging fluid to said crank case, means controlled by said piston for opening said inlet port to said crank case to charge said cylinder, a supercharging chamber connected to said crank case, means for admitting a portion of the exhaust gas to said supercharging chamber when near its maximum pressure to supercharge said cylinder, and means for discharging the remaining exhaust gas at a lower pressure.

79. A combustion engine comprising a plurality of cylinders, pistons, and inlet and exhaust means, separated fluid pressure reservoirs adapted to charge said cylinders through said inlet means, a fluid supply source, and an inlet manifold and branch manifolds connecting said supply source to said reservoirs, said manifold and branch manifolds defining a plurality of paths of like dimensions and shape from said supply source to each of said reservoirs.

80. A combustion engine comprising a cylinder having inlet and exhaust ports, a piston adapted to open and close said ports, a fluid pressure reservoir adapted to communicate with said inlet port in one position of the piston, a pair of opposite escapement ports in the cylinder connected with said reservoir, and an extension on the piston head adapted to uncover said escapement ports at the beginning of the exhaust and at the beginning of the compression stroke.

81. A combustion engine comprising a cylinder having inlet and exhaust ports, a piston adapted to open and close said ports, a fluid pressure reservoir adapted to communicate with said inlet port in one position of the piston, a pair of opposite escapement ports in the cylinder connected with said reservoir, and an extension on the piston head shaped to uncover the escapement ports in predetermined positions of the piston and to deflect exhaust gas from said reservoir toward the main exhaust port.

82. A combustion engine comprising a cylinder having inlet and exhaust ports, a piston adapted to open and close said ports, a fluid pressure reservoir adapted to communicate with said inlet port in one position of the piston, spaced escapement ports in the cylinder connected with said reservoir, and an extension on the piston head having grooves adapted to uncover the escapement ports in predetermined positions of the piston and a deflector between said grooves adapted to direct exhaust gas from said reservoir toward the main exhaust port.

83. A combustion engine comprising a crank case, a crank shaft, a crank disc connected to the crank shaft, a pair of opposed cylinders supported by the crank case and having inlet and exhaust ports, pistons connected to said crank disc and adapted to open and close the ports in the cylinders, connected supercharging chambers opening into the crank case, means for connecting the inlet ports in the cylinders with the crank case in one position of the pistons, and spaced escapement ports in each cylinder connected to opposite ends of said supercharging chambers and adapted to be uncovered in predetermined positions of the pistons to inject exhaust gas into said supercharging chambers.

84. A combustion engine comprising a cylinder having inlet and exhaust ports, a piston adapted to open and close said ports, a fluid pressure reservoir adapted to communicate with said inlet port to charge said cylinder, and escapement means in said cylinder connected to said reservoir and opened and closed by said piston, the piston head containing grooves arranged relatively to said escapement means to uncover said escapement means to discharge high pressure exhaust gas against the fluid in said reservoir and to discharge exhaust gas from said reservoir through said exhaust port.

WILLIAM HARPER, Jr.